United States Patent [19]

Stoufflet et al.

[11] 4,194,365
[45] Mar. 25, 1980

[54] HYDRAULIC MOTOR CONTROL

[75] Inventors: René G. Stoufflet, Le Plessis Belleville; Victor Yéou, Meaux, both of France

[73] Assignee: Poclain, Le Plessis-Belleville, France

[21] Appl. No.: 914,065

[22] Filed: Jun. 8, 1978

[30] Foreign Application Priority Data

Jun. 23, 1977 [FR] France ................ 77 19309

[51] Int. Cl.² .................. F15B 9/08; F15B 9/14
[52] U.S. Cl. ........................ 60/468; 60/494; 60/DIG. 2; 60/493
[58] Field of Search .......... 60/368, 388, 390, 468, 60/493, 494, DIG. 2; 90/35, 37, 39

[56] References Cited

U.S. PATENT DOCUMENTS

| | | | |
|---|---|---|---|
| 3,369,360 | 2/1968 | DeBiasi | 60/494 X |
| 3,672,168 | 6/1972 | Salmon | 60/494 X |
| 3,964,262 | 6/1976 | Patton | 60/494 X |

Primary Examiner—Edgar W. Geoghegan
Attorney, Agent, or Firm—Mason, Fenwick & Lawrence

[57] ABSTRACT

A control system for stopping a hydraulic motor in a predetermined position comprises a valve connected in parallel across the motor, the valve having a closed position and an open position in which flow is via a throttle orifice. When the motor is being driven normally the valve is closed. When the main control regulator for the motor is moved to stop the motor, the valve is automatically opened to allow limited fluid flow through the motor during a slowing down phase. A detector senses when the motor is a predetermined distance from its desired stopping position, and moves the valve to its closed position. Overload valves are provided to prevent overpressures.

4 Claims, 23 Drawing Figures

$$\begin{matrix}a\\b\end{matrix} \!\!\!\!\!\!\!\!\!\!\!\! \supset\!\!\!\circ \!-\!\! S=\overline{a.b}$$

| b\a | 0 | 1 |
|---|---|---|
| 0 | 1 | 1 |
| 1 | 1 | 0 | fig.7  fig.8

| R | QD | QC | QB | QA |
|---|----|----|----|----|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 |   | 1 | 1 | 1 |
| 8 | 1 | 0 | 0 | 0 |
| 9 | 1 | 0 | 0 | 1 |

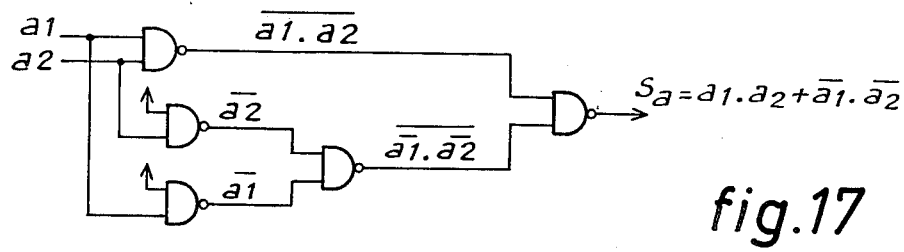
fig.17
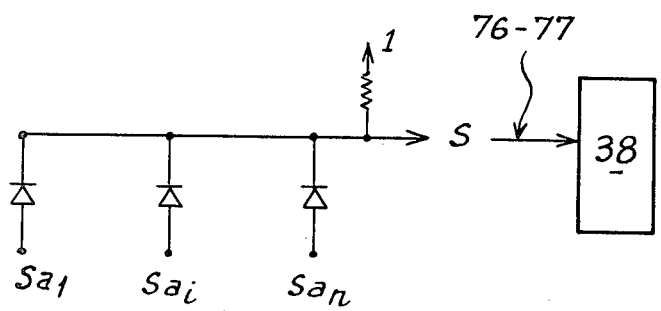
fig.18
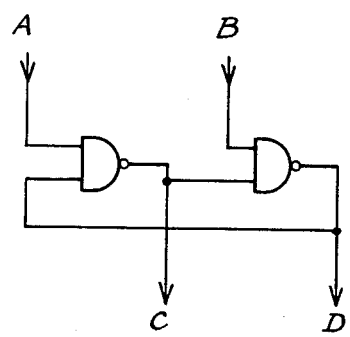
fig.19
fig.20

HYDRAULIC MOTOR CONTROL

This invention relates to the automatic stoppage of a hydraulic motor in a predetermined position.

This general field has a particular application to the control of the rotation of the pivoting turret of a civil engineering or "public work" machine, and especially to the control of the rotation of the turret of a shovel. However, the invention is in no way restricted to this application.

The object of the invention is an automatic device which controls the return of the work equipment to its original working position. Such a device can improve the output per hour of the shovel due to the optimization which is obtained of the average speed of rotation, which is therefore no longer dependent upon the competence of the driver.

Two distinct states of the art are known. In accordance with a first technique where the motor for rotation is controlled by a fluid regulator, stoppage of rotation is controlled by a cam which causes closure of the said regulator. In accordance with a second technique a rotation is provided having two unequal flows controlled respectively by two regulators mounted in parallel. Stoppage is controlled by a cam which causes first of all closure of the large regulator, then closure of the small regulator.

The invention proposes a new technique in which the brakage of the turret is effected without consumption of hydraulic power, whilst being progressive.

Hence the object of the invention is a device for automatic stoppage of the rotation of a hydraulic motor, for example, a driving motor of the pivoting turret of a shovel, this preferred application, however, not being the only one possible.

In the two feedpipes to the motor, between the latter and the main control regulator there is mounted in parallel with the motor a solenoid valve the bidirectional flow orifice of which exhibits a throttle, the said solenoid valve having on the one hand a control coupled to that of the main regulator so that the solenoid valve is in its closed position when the regulator is controlling the normal rotation of the motor but is brought into its open position upon closure of the main regulator, and on the other hand a control in the direction of closure, coupled to a detector of a predetermined angular position of the motor with respect to the desired position of stoppage.

In addition and advantageously, in the two feedpipes to the motor, between the latter and the main control regulator there is likewise mounted in parallel with the motor a set of two unidirectional release valves arranged in parallel with and in opposite directions to one another.

The invention will be better understood and secondary characteristics and the advantages of them will become apparent during the course of the description of an embodiment given below by way of example.

It is to be understood that the description and the attached drawings are given only by way of indication and non-restrictively.

Reference will be made to the attached drawings in which:

FIG. 7 represents the NAND function;

FIG. 8 is the table of the output states from the NAND function;

FIG. 17 is the logical circuit of the angle comparator employed;

FIG. 18 is the table of the output states of this comparator;

FIG. 19 represents the production of an AND function;

FIG. 20 represents a bistable circuit employed in a control unit of the device in accordance with the invention;

The basic concept of the invention is founded on a fact: Given a mass M revolving at a velocity V and at a distance R, the braking angle A is inversely proportional to the braking torque applied. If the braking torque is adjustable the braking angle A is so likewise.

For certain types of work, digging a trench, for example, the equipment after having emptied its bucket at the same spot, returns onto the axis of the trench always at the same speed and with the empty bucket substantially at the same working reach. Hence its kinetic energy is constant. Hence with a constant braking torque the position of stoppage of the equipment may be determined.

Figure 1:
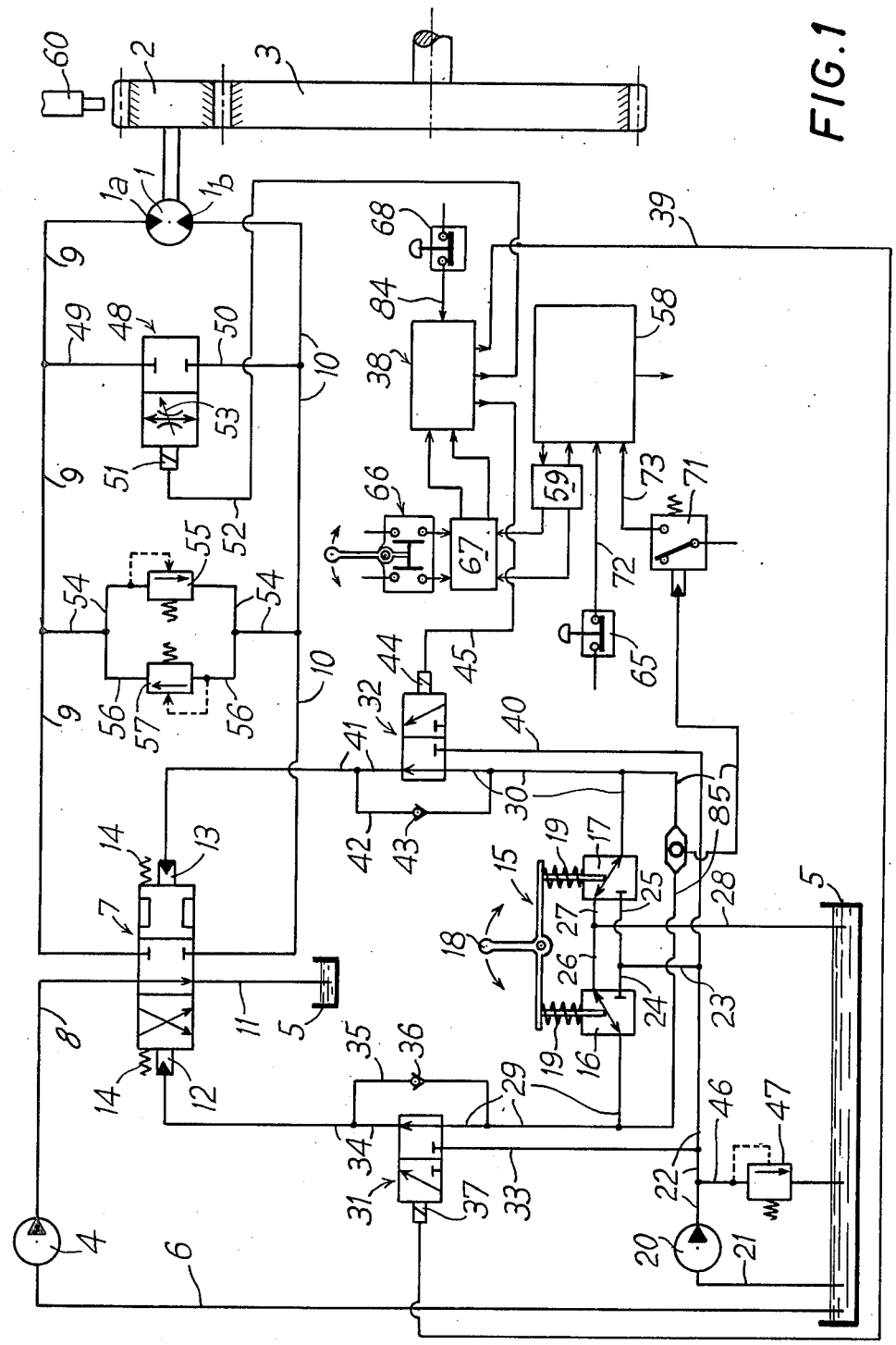
FIG. 1 represents the control circuit in accordance with the invention, of the driving motor of the turret of a public works machine.

The circuit of FIG. 1 turns these remarks to account and enables the control of the hydraulic motor 1 for driving the pinion 2 which meshes with the toothed crown 3 integral with the turret of a hydraulic shovel.

A pump 4 is connected to a fluid reservoir 5 by its suction pipe 6 and to a three-position regulator 7 by its delivery pipe 8. The motor 1 is reversible and has its two main connections 1a, 1b connected by pipes 9, 10 to the regulator 7. Finally, this regulator is connected to the reservoir 5 by a pipe 11.

The three-positions of the regulator 7 correspond:
the first position, to putting pipes 8 and 10 and pipes 9 and 11 into communication;
the second position, to putting into communication the pipes 8 and 11 and blocking off the pipes 9 and 10; and
the third position, to putting the pipes 8 and 9 and the pipes 10 and 11 into communication.

The regulator 7 is equipped with two jacks 12 and 13 for control of its position and with springs 14 which tend to locate it and keep it in its second position.

The jacks 12, 13 are fed by a pilot circuit which comprises a manual manipulator 15. The latter comprises two valves 16 and 17, each two-position, coupled to a manual lever 18 and to springs 19. A pilot pump 20 has its suction pipe 21 connected to the reservoir 5 and its delivery pipe 22 connected to a pipe 23 to which are connected two pipes 24, 25 which in turn are connected, the pipe 24 to the valve 16 and the pipe 25 to the valve 17. To the valves 16, 17 are likewise connected on the one hand pipes 26, 27, both connected to the reservoir 5 by a pipe 28, and on the other hand pipes 29, 30 connected to solenoid valves 31, 32 respectively.

The first position of the valve 16 corresponds with putting the pipes 29 and 26 into communication and with blocking off the pipe 24, whereas the second position corresponds with putting the pipes 24 and 29 into communication and blocking off the pipe 26. In a similar manner the first position of the valve 17 corresponds with putting the pipes 27 and 30 into communication and with blocking off the pipe 25, whereas the second position corresponds with putting the pipes 25 and 30 into communication and with blocking off the pipe 27.

The solenoid valve 31 is in addition connected to the pipe 22 by a pipe 33 and to the jack 12 by a pipe 34. A pipe 35 connects the pipes 29 and 34, whilst a non-return valve 36 is arranged in the pipe 35 and lets the fluid pass from the pipe 29 towards the pipe 34. The control member 37 of the solenoid valve 31 is furthermore connected to a control unit 38 by a connection 39. The two-positions of the solenoid valve 31 correspond:

the first position, with putting the pipes 33 and 34 into communication and with blocking off the pipe 29; and the second position, with putting the pipes 29 and 34 into communication and with blocking off the pipe 33.

The solenoid valve 32 is in turn connected to the pipe 22 by a pipe 40 and to the jack 13 by a pipe 41. A pipe 42 connects the pipes 30 and 41, whilst a non-return valve 43 is arranged in the pipe 42 and lets the fluid pass from the pipe 30 towards the pipe 41. The control member 44 of the solenoid valve 32 is furthermore connected to the control unit 38 by a connection 45. The two positions of the solenoid valve 32 correspond:

the first position, with putting the pipes 40 and 41 into communication and with blocking off the pipe 30; and the second position, with putting the pipes 30 and 41 into communication and with blocking off the pipe 40.

The connection is to be observed of the pipe 22 to the pipe 46 connected to the reservoir 5, in which there is arranged a calibrated release valve 47.

It is likewise to be observed that a solenoid valve 48 is connected to the pipes 9 and 10 by pipes 49 and 50, respectively, whilst its control member 51 is connected to the control unit 38 by a connection 52. The two positions of this solenoid valve 48 correspond:

the first position, with putting the pipes 49 and 50 into communication, with the interposition of an adjustable constriction 53; and the second position, with blocking off the pipes 49 and 50.

Again, a pipe 54 connects the pipes 9 and 10, whilst a calibrated release valve 55 is arranged in this pipe 54 and beyond a predetermined pressure, allows flow of the fluid from the pipe 9 towards the pipe 10. A pipe 56 is connected to the pipe 54 on opposite sides of the release valve 55, whilst another calibrated release valve 57 is arranged in this pipe 56 and beyond a predetermined pressure allows flow of the fluid from the pipe 10 towards the pipe 9.

Figure 4:
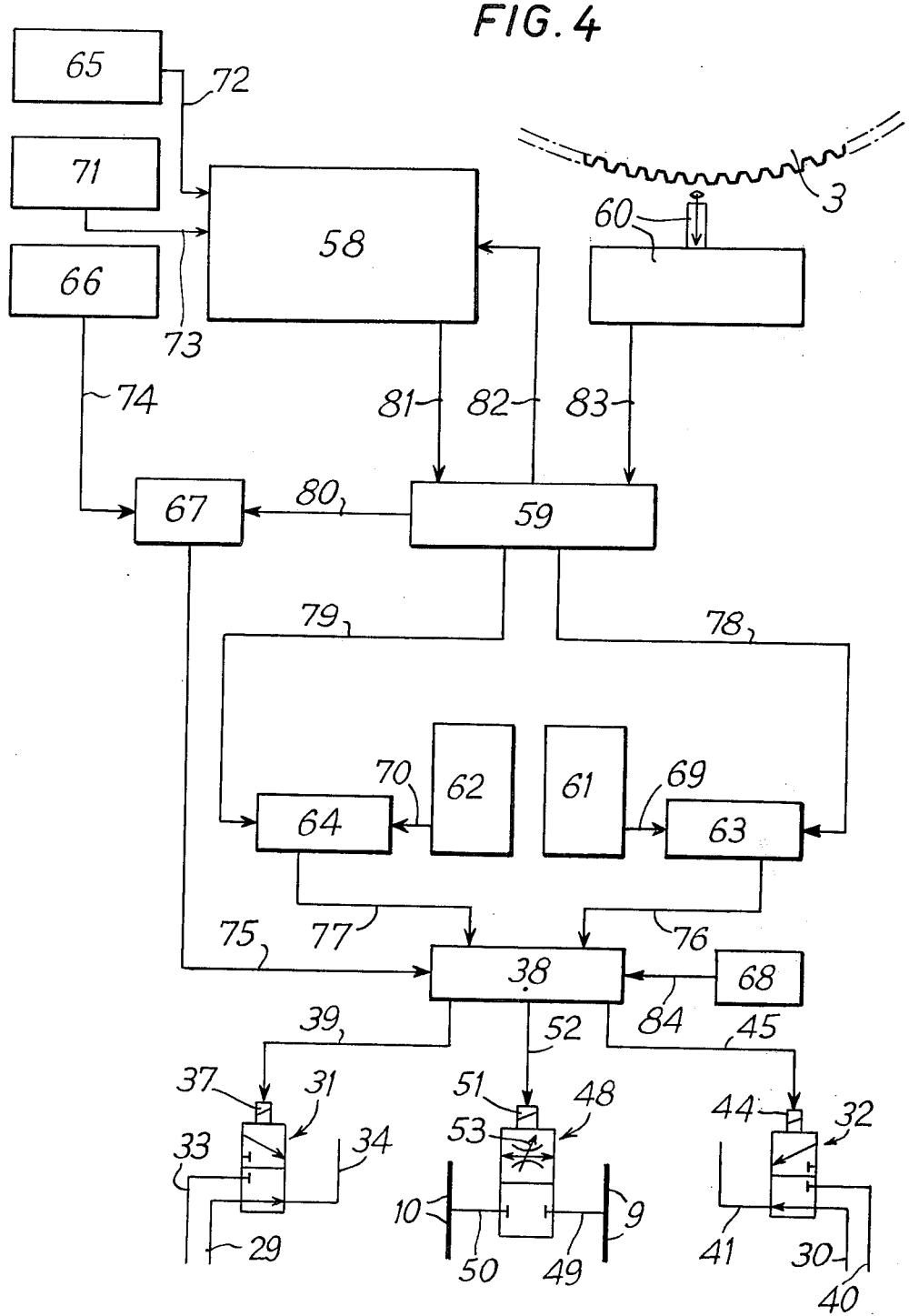
FIG. 4 represents the diagram of the logic of the control circuit of FIG. 1.

The logical control circuit is represented in FIG. 4. It comprises besides the control unit 38:

a memory 58 combined with a zero-reset device which records the starting position of the motor 1 and resets to zero a plus/minus counter 59;

this plus/minus counter 59;

a detector 60 of the angle of rotation of the motor, in fact, here, of the toothed crown 3 of the turret, which records the number of teeth of this crown passing by in front of it;

a selector 61 of the angle of stoppage of the motor and a braking-angle selector 62, each connected to an angle-comparator 63, 64 by a connection 69, 70 respectively;

a device 65 for indication of the choice of operation of the motor by means of the manual control 18;

a relay 71 which signals operation of the motor by means of the manual control 18;

a device 66 for control of the automatic return of the motor to its original position;

a detector 67 of the direction of rotation of the motor; and an emergency stop button 68.

The following connections are established:

72, between the device for indication of the choice of manual operation 65 and the memory 58;

73, between the relay 71 and the memory 58;

74, between the control device 66 and the detector 67;

75, between the direction detector 67 and the control unit 38;

76, 77, between the angle comparators 63, 64 and the unit 38 respectively;

78, 79, between the plus/minus counter 59 and the angle comparators 63, 64;

80, between the plus/minus counter 59 and the direction detector 67;

81, 82, between the plus/minus counter 59 and the memory 58, the connection 81 carrying the direct information proceeding from the memory and the connection 82 carrying the return information proceeding from the plus/minus counter 59;

83, between the angle-of-rotation detector 60 and the plus/minus counter 59;

84, between the emergency stop button 68 and the control unit 38; and 85, (FIG. 1) between the pipes 29 and 30 and the relay 71, the connection 85 consisting of pipes connected to a jack for control of the said relay.

Figure 2:
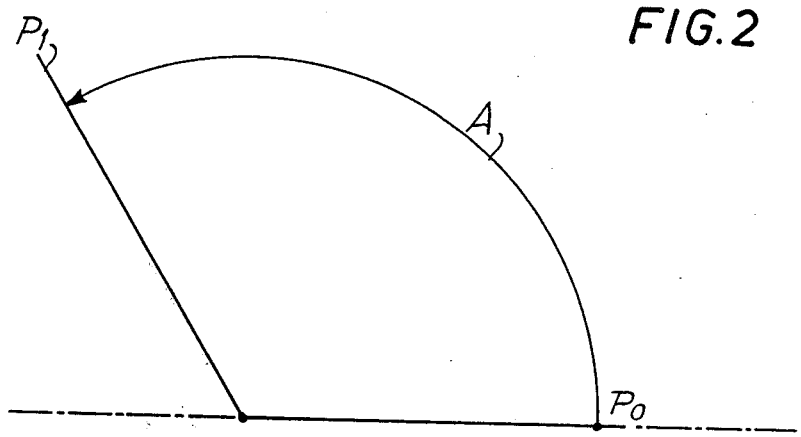
FIGS. 2 and 3 represent diagrammatically two phases of operation of the circuit of FIG. 1.

FIG. 2 represents the "forward" rotation of the toothed crown 3 by an angle A between the starting position P0 and the finishing position P1.

Figure 3:
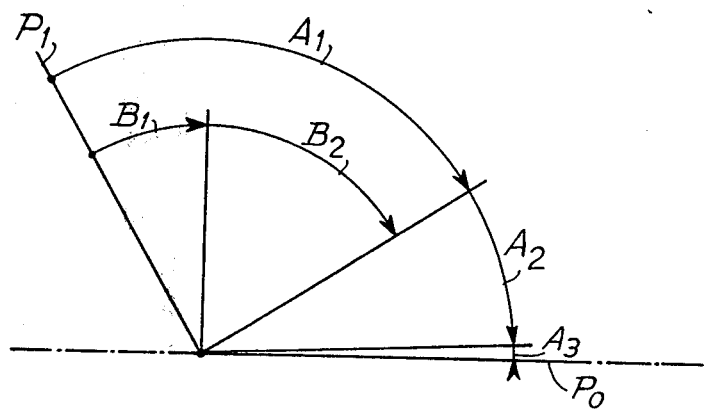

FIG. 3 represents the "return" rotation from the position P1 to the position P0. The rotations by angles A1, A2, A3, are carried out in succession, corresponding respectively:

A1, to the feeding of the motor 1;

A2, to the braking of the motor 1 and of the turret by means of the solenoid valve 48, then located in its first position, the main feed to this motor being stopped by the regulator 7; and A3, to the stoppage of the motor 1, the regulator 7 and the solenoid valve 48 being in their respective second positions.

Naturally: $A1+A2+A3=A$.

Again, the angle A1 may be broken down into two angles B1 and B2, firstly (B1) of acceleration of the parts being driven in rotation, then (B2) of driving these parts at constant speed.

The operation obtained will now be explained.

For the "forward" rotation the lever 18 is displaced towards the left, for example, and locates the valve 16 in its second position. The piloting fluid delivered by the pump 20:

arrives in the pipe 29;

arrives next in the pipe 85;

acts on the relay 71, which controls the recording of the starting position of the motor by the memory 58 which in turn resets to zero the plus/minus counter 59. The piloting fluid (pump 20) then arrives in the pipe 34 and in the jack 12 and locates the regulator 7 in its first position. The connection 1b to the motor 1 is fed by the main pump 4 until action ceases on the lever 18. During this manoeuvre the solenoid valve 48 is kept in its second position (pipes 49 and 50 blocked off).

The "return" rotation is carried out either under manual control by action upon the lever 18 opposite to the first action carried out, or under automatic control. Only the latter has to be studied here.

For automatic return the control device 66 is actuated. The return command is directed towards the direction-of-rotation detector 67 which transmits the command to the control unit 38 only when the reverse direction of rotation is desired. The latter controls the operation of the solenoid valve 32 and locates it in its first position. The piloting fluid (pump 20) is then directed towards the jack 13, locating the regulator 7 in its third position. The main pump 4 then feeds the connection 1a, which effectively causes the rotation of the motor 1 in the direction opposite to the previous one. The solenoid valve 48 is still in its second position.

The plus/minus counter 59 records the angle of return rotation detected by the detector 60. It sends the information to the comparator 64 which as a function of the angle A1 chosen by the selector 62, gives the order to the unit 38 to control the restoration of the solenoid valve 32 into its second position as soon as the return rotation has reached the value A1. Simultaneously the control unit 38 locates the solenoid valve 48 in its first position. Thus the regulator 7 isolates the motor 1 from the pump 4 but at the same time the fluid delivered by the connection 1b from this motor does not block the motor because it can pass through the constriction 53 and feed again the connection 1a. Overpressures are of course avoided by the release valves 55 and 57. During this phase of operation (angle A2 in FIG. 3) the motor 1 is no longer being fed and is being braked.

Finally, when the limit of A2 is reached the plus/minus counter 59 informs the comparator 63 of it, which verifies the coincidence of the angle of rotation effected with the value A2 chosen by the selector 61 and gives the order to the control unit 38 to relocate the solenoid valve 48 in its second position. The motor 1 is then theoretically blocked, but continues to rotate, however, from A3 up to complete stoppage, the fluid delivered through the connection 1b passing through the release valve 57 to feed the connection 1a, the said release valve 57 limiting the pressure in the pipe 10 to the value of its calibration pressure.

The resetting to zero at the start of the "forward" rotation enables in all cases the choosing of angles of rotation from no matter what position of start of the motor 1.

Finally, naturally, the emergency stop button 68 enables the automatic return to be stopped if there is need. Action of this button enables the control unit 38 to trigger stoppage of the control of the solenoid valves 31 and 32 and of the solenoid valve 48 and thus to obtain the stoppage of the motor 1.

The invention is not restricted to the embodiment described but on the contrary covers any variants which might be applied to it without departing from its scope or its spirit.

APPENDIX

The various components of the logical diagram of FIG. 4 are in themselves known to those skilled in the art and on this account have not previously been described. In order to justify the assertion which has just been expressed, embodiments of these components are defined below by way purely of information and non-restrictively.

Detector 60 of the angle of rotation of the motor

This is in fact a detector of the passing by of the teeth of the toothed crown.

Figure 5:
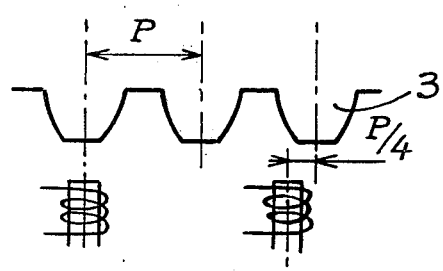
FIG. 5 represents an embodiment of the angle-of-rotation detector employed.

This function is achieved with two inductive proximity detectors mounted opposite the teeth of the crown so that the signals supplied upon relative displacement between crown and detectors are dephased by a quarter of a cycle (FIG. 5). This enables:

angular accuracy of $\frac{1}{4}$ of the pitch of the teeth;

removing the doubt about the direction of rotation.

The detectors employed are of oscillator type and hence are capable of detecting the presence or absence of metal in front of their sensitive faces even in the absence of relative movement. ("Ministop" brand distributed in France by "la commande électronique").

Depending upon whether the signal from one detector is in advance of or behind by a quarter of a phase with respect to the other, the decoder emits signals over one of the two lines (corresponding with rotation left and right) of the connection 83, connected respectively to the plus and minus inputs to the plus/minus counter 59.

Figure 6:
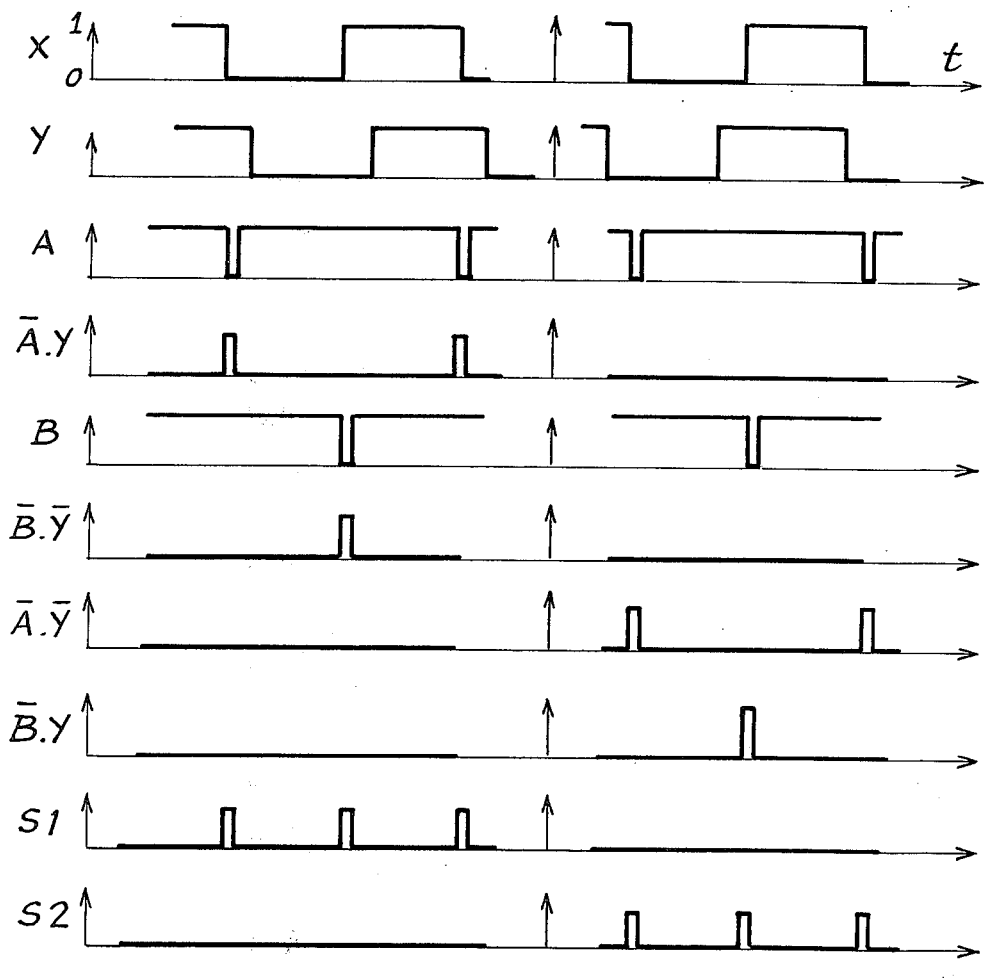
FIG. 6 is a graph of the possible operations of the detector of FIG. 5.

The operation and diagram are represented in FIG. 6 where x and y are the signals provided by the detectors during rotation in the direction $>0$ or $<0$.

Each falling face of the signal x controls a monostable which delivers a negative pulse: this is the signal A; similarly each rising face of x makes a pulse B appear. The state of the output from the detector y at the instant of the pulse gives information about the direction of rotation and thanks to a set of gates enables a plus or minus pulse to be sent.

A = signal A $\overline{A}$ = inverted signal A

· = logical AND

+ = logical OR

It may be seen on the graph of the signals that if y is behind x the counting pulses appear at the output $S1=\overline{A}\cdot y+\overline{B}\cdot \overline{y}$. Conversely, if y is ahead, the pulses appear at $S2=\overline{A}\cdot \overline{y}+\overline{B}\cdot y$.

The logical equations are solved by combinations of NAND gates (FIGS. 7 and 8), the reminder for the NAND function being shown in FIG. 7 and the table of the output states S of the function constituting the FIG. 8.

Figure 9:
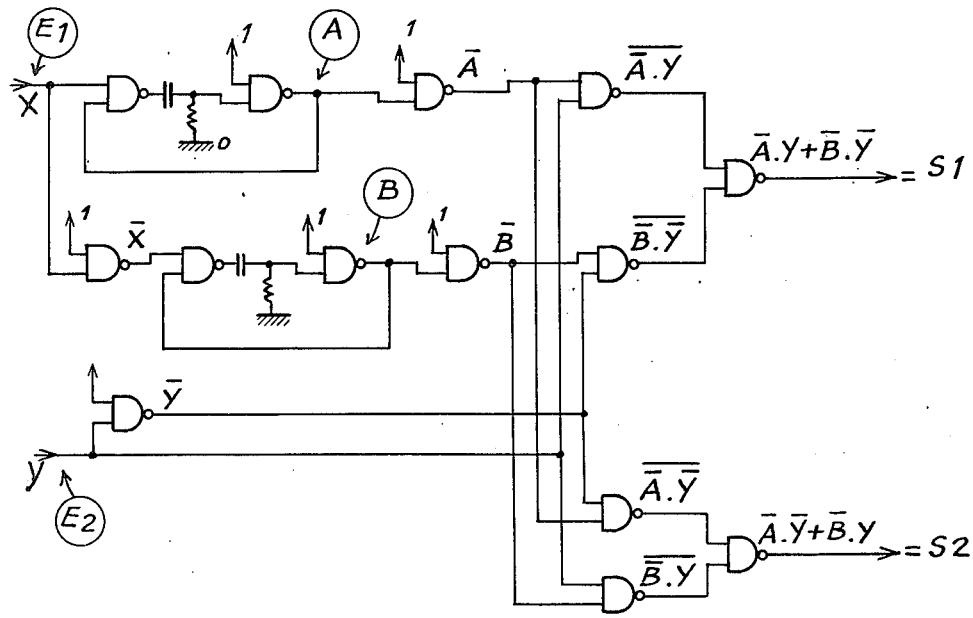
FIG. 9 is the wiring diagram of the detector.

The embodiment has been made with "Texas Instruments" integrated circuits SN 7400 which include each 4 NAND gates. The wiring diagram used is represented in FIG. 9.

Figure 10:
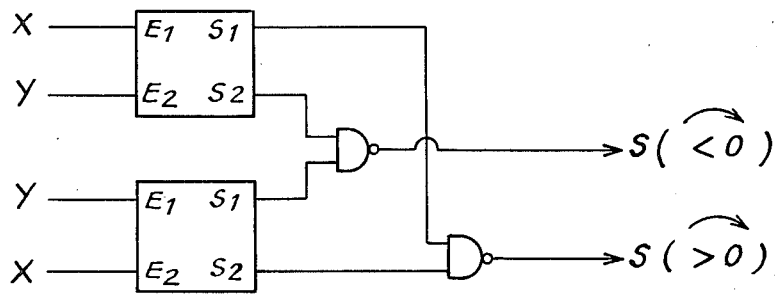
FIG. 10 is a diagram of a possible partial assembly.

This circuit gives two signals per pitch. It is possible by permuting x and y to create two supplementary signals dephased by a quarter of a pitch with respect to the previous ones (FIG. 10). The "positive" and "negative" signals are routed towards the inputs to the plus/minus counter by the connection 83.

Plus/minus counter 59

Figure 11:
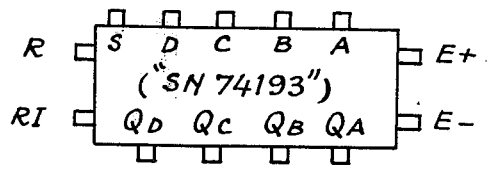
FIG. 11 represents the basic element of the plus/minus counter employed.

The basic element of this apparatus is the type "decade" integrated circuit (for example that from "Texas Instruments" SN 74193, FIG. 11). This circuit includes besides its feed connections, 7 inputs:
plus input E+
minus input E—
4 value-setting inputs A, B, C, D respectively assigned the weights $2^0$, $2^1$, $2^2$, $2^3$
an input S which enables the value displayed at the inputs A, B, C and D to be transferred to the flip-flops constituting the counter; and 6 outputs:
$Q_A$, $Q_B$, $Q_C$, $Q_D$, respectively assigned weights $2^0$, $2^1$, $2^2$, $2^3$ which give information about the state of the flip-flops in the counter and consequently represent the value of the counting 1 Report output R over which a signal appears when the counter terminates a plus cycle, that is to say, when it passes from the value 9 to the value 0 under the effect of a pulse at its input E+

1 inverse Report output RI over which a signal appears when the counter terminates a minus cycle, that is to say, when it passes from the value 0 to the value 9 under the effect of a pulse at its input E—.

These two last outputs enable the decades to be connected together so as to constitute a counter of suitable capacity.

Figure 12:
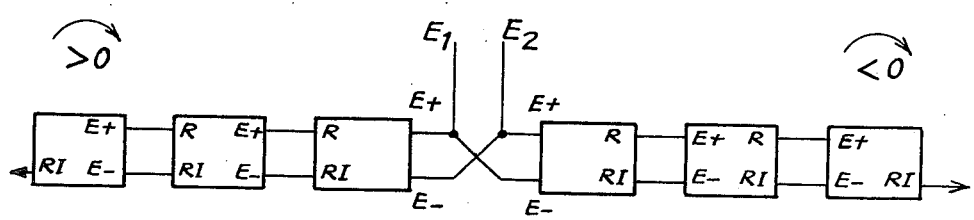
FIG. 12 represents the diagram of the plus/minus counter produced.

The embodiment used was that shown in FIG. 12.

The inputs E1 and E2 are respectively connected to the outputs S1 and S2 from the decoding circuit of the angle-of-rotation detector 60. The last outputs RI are connected to the direction-of-rotation detector 67 by the connection 80.

Direction-of-rotation detector 67

Figure 13:
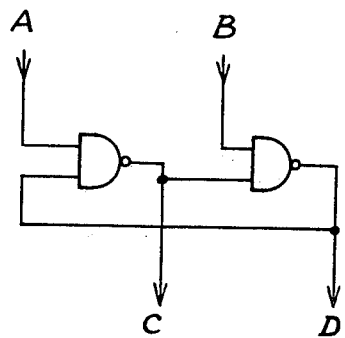
FIG. 13 represents the diagram of a flip/flop employed for producing a direction-of-rotation detector.

This detector is composed of a flip-flop produced by means of two NAND elements in accordance with the diagram of FIG. 13.

A pulse coming down from the state 1 at an input A or B puts the corresponding outputs C or D in the state 1 until the appearance of a pulse at the other input.

Figure 14:
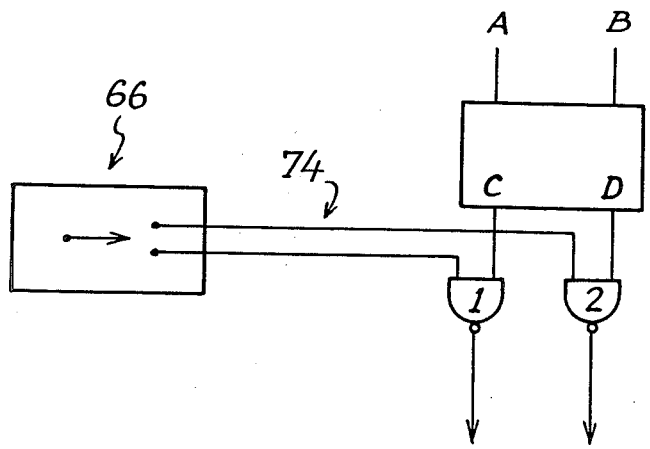
FIG. 14 is the diagram of the detector produced.

The inputs A and B being connected to the inverse report outputs from the "positive" and "negative" counters, the state of the outputs C and D memorized the direction in which the rotation has been carried out. These outputs serve to open or close two NAND gates which authorize or do not authorize the automatic return control proceeding from the device 66 through the connection 74, depending upon whether the "return" direction is compatible or not with the "forward" movement memorized by C and D (FIG. 14).

The operation obtained is the following:

in the event of a "forward" movement in the "positive" direction:
the "negative" direction counter emits a pulse over the RI output connected to A,
the output C moves over to 1,
the gate 1 is opened,
the return control in the "negative" direction is authorized,
the output D being at 0, the gate 2 remains closed,
the return control in the "positive" direction is prohibited.

The signals emitted by the gates 1 and 2 are transmitted to the control unit 38 through the connection 75 to be amplified and applied to the solenoid control valves 31 and 32.

The plus/minus counter 59 is connected to the memory 58 for memorization of the starting position. The relay 71 sends to the memory 58 through the connection 73 a signal corresponding with starting up "forward." The memory 58 is entrusted with memorizing this starting position by the plus/minus counter on the condition that it is effectively a matter of a start and not of a correction along the way. Doubt upon this point is removed by examination of the weight bits made by the plus/minus counter to correspond with the "forward" direction.

Figures 15, 16:
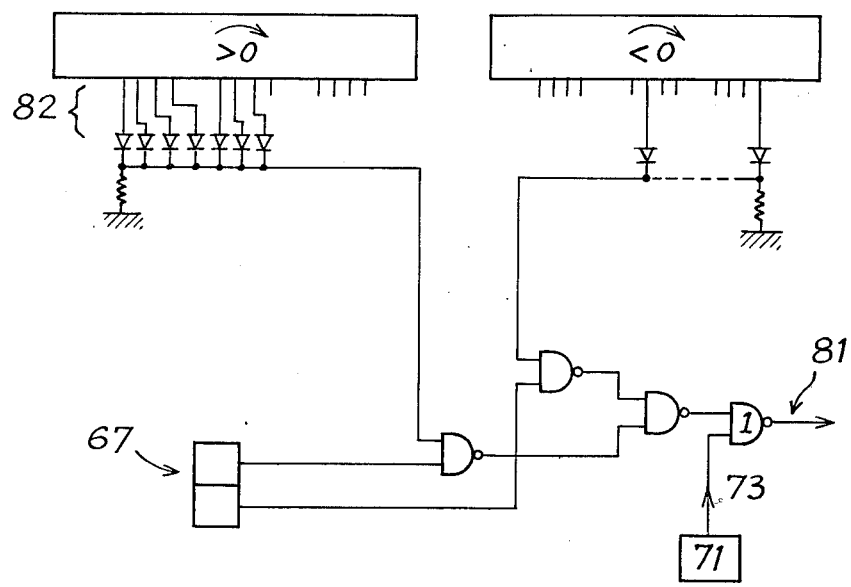
FIG. 15 is the wiring diagram of the various elements of the control device claimed.
FIG. 16 is the correspondence table of the elements constituting an angle selector.
Figure 21:
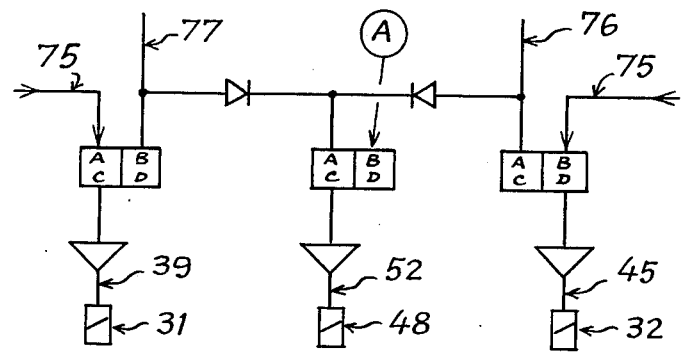
FIG. 21 represents the diagram of the said control unit.

The diagram chosen is that shown in FIG. 15.

If the weight bits made by the counter to correspond with the "forward" direction are zero, it is admitted that the turret is in its starting position and the gate 1 is opened, authorizing resetting of the counters to zero.

Angle selectors 61 and 62

These selectors consist of three coder wheels each. These wheels are rotary switches of 10 positions representing the 10 digits of a decade.

Besides their feed connections, these wheels have 4 outputs $Q_A$, $Q_B$, $Q_C$, $Q_D$ assigned weights $2^0$, $2^1$, $2^2$, $2^3$ which represent by their state (high or low) in binary a value corresponding with the position of the wheel (FIG. 16).

Angle comparator 63, 64

This comparator is connected to the outputs from the plus/minus counter and to the corresponding outputs from the coder wheels. When the information proceeding from the plus/minus counter 59 through the connection 79 or 78 and from the selector 61, 62 through the connection 69, 70 respectively are identical, the comparator sends to the control unit 38 a signal which controls the applying of braking to the rotation motor.

The logical circuit is represented in FIG. 17, the table of the output states from the comparator being represented in FIG. 18.

$Q_1$ is connected to one output from the plus/minus counter, $Q_2$ is connected to the corresponding output from the angle selector.

This circuit is employed for each output from the plus/minus counter.

An AND function produced by diode is connected to all of the outputs Sa from each counter (FIG. 19).

$$S = Sa_1 \cdot Sa_2 \cdot Sa_i \ldots Sa_n$$

Control unit 38

This element is composed of 3 bistable circuits such as those in FIG. 20, the inputs to which are connected to the comparators and to the direction detector, and the outputs from which are applied to power amplifiers ("Darlington" circuits with transistors) capable of feeding the electromagnets of the valves 31, 32 and 48, where A is the stoppage signal which causes closure of the braking valve.

Figure 22:
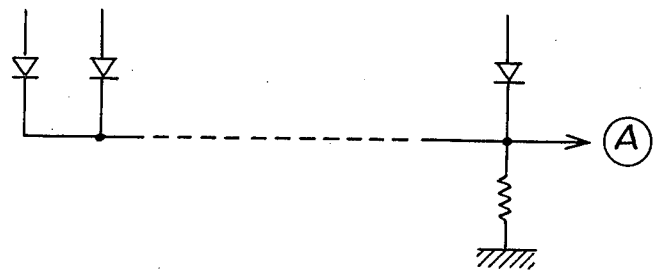
FIG. 22 represents the diagram of the production of a signal employed in the diagram of FIG. 21.

This signal is prepared from the outputs from the plus/minus counter (FIG. 22).

A is equal to zero when all these outputs are at zero.

Figure 23:
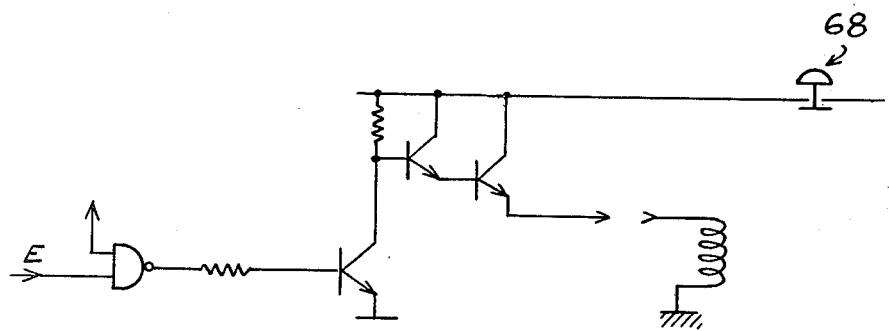
FIG. 23 represents a power amplifier employed.

Finally, the power amplifier is that of FIG. 23, where the input E is connected to the output from a flip-flop.

What is claimed is:

1. A device for automatic stoppage of the rotation of a hydraulic motor having a main control regulator and two hydraulic fluid supply pipes connecting the motor to the main control regulator, the device comprising: a power actuated valve connected between the supply pipes in parallel with the motor, the valve having a closed position and an open position in which flow through the valve is via a throttle orifice, and being under the control of control means arranged such that the valve is in its closed position when the said main control regulator is permitting normal rotation of the motor but is brought into its open position upon closure of the said main control regulator; means for detecting a predetermined angular position of the motor with respect to the desired position of stoppage; and means responsive to said detecting means for closing the valve.

2. A device according to claim 1 comprising in addition a set of two unidirectional release valves arranged in parallel with and in opposite directions to one another between the two hydraulic fluid supply pipes to the motor, the release valves being located between the motor and the main control regulator in parallel with the motor.

3. A device according to claim 1 wherein the throttle orifice is of variable cross-section.

4. A device according to claim 1 wherein the valve is a solenoid valve.

* * * * *